United States Patent [19]

Stofflet et al.

[11] Patent Number: 5,769,575
[45] Date of Patent: Jun. 23, 1998

[54] OSCILLATORY MOTION DEVICE FOR DRILL PRESS

[75] Inventors: Todd Laverne Stofflet; Henry Martin Pollak; Douglas Allen Bowman, all of Pottstown, Pa.

[73] Assignee: American Machine & Tool Company, Inc., Royersford, Pa.

[21] Appl. No.: 654,426

[22] Filed: May 29, 1996

[51] Int. Cl.⁶ .................................................. B23B 39/00
[52] U.S. Cl. ........................... 408/17; 408/129; 408/135; 408/140
[58] Field of Search ................................ 408/17, 24, 25, 408/129, 128, 124, 132, 135, 139, 140

[56] References Cited

U.S. PATENT DOCUMENTS

| | | |
|---|---|---|
| 1,277,377 | 9/1918 | Carter . |
| 1,324,454 | 12/1919 | La Fortune . |
| 1,762,606 | 6/1930 | Bjorklund . |
| 2,519,542 | 8/1950 | Carey et al. . |
| 3,214,773 | 11/1965 | Benjamin et al. ................. 408/140 X |
| 3,314,312 | 4/1967 | Niehaus, Jr. et al. ................. 408/128 |
| 3,418,758 | 12/1968 | McEwan . |
| 3,704,957 | 12/1972 | Petroff ..................................... 408/129 |
| 3,762,830 | 10/1973 | Pettigrew ............................... 408/135 |
| 4,452,552 | 6/1984 | Watkins ................................ 408/17 X |
| 5,061,124 | 10/1991 | Chen ...................................... 408/135 |
| 5,328,303 | 7/1994 | Jang ...................................... 408/17 X |
| 5,402,605 | 4/1995 | Paules ................................... 451/157 |
| 5,525,099 | 6/1996 | Baird et al. . |

FOREIGN PATENT DOCUMENTS 274467  7/1927  United Kingdom ............... 408/17

OTHER PUBLICATIONS

"An oscillating sander kit for your drill press", *Wood Magazine*, Sep., 1994, p. 81.

Data Sheet for Ryobi, Model OSS450 Oscillating Spindle Sander (one page) (referred to in previous article).

D. Dorn, "Oscillating Drum Sander", *Workbench*, Feb.-Mar., 1992 (pp. 64–66).

AMT Power Tools Plus catalogue, American Machine & Tool Company, Royersford, PA cover sheet and p. 20, Winter, 1993.

*Primary Examiner*—A. L. Pitts
*Assistant Examiner*—Henry W. H. Rsai
*Attorney, Agent, or Firm*—Panitch Schwarze Jacobs & Nadel, P.C

[57] ABSTRACT

A drill press has a drive motor with output shaft that drives a chuck through a rotatable and vertically displaceable quill and a first drive coupling which includes a pair of pulleys, such as cone pulleys, and a belt extended between the cone pulleys. A rotary power take-off in the form of an additional pair of pulleys and a drive belt extracts rotary power from the drive coupling between the motor and the chuck and transfers it to an oscillatory motion device. The device includes a worm and worm gear and an eccentrically mounted arm which convert rotary motion from the rotary power take-off into a reciprocating linear motion. A lever is pivotally mounted to the device with one end engaged with the quill and a remaining, opposing end coupled with the arm. Reciprocation of the arm causes reciprocation of the lever which causes reciprocation of the quill, chuck and any tool held in the chuck. The arm is releasably engaged with and is coupled with the lever through a detent block.

27 Claims, 9 Drawing Sheets

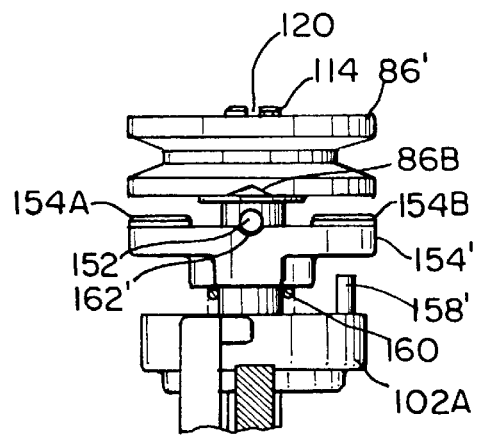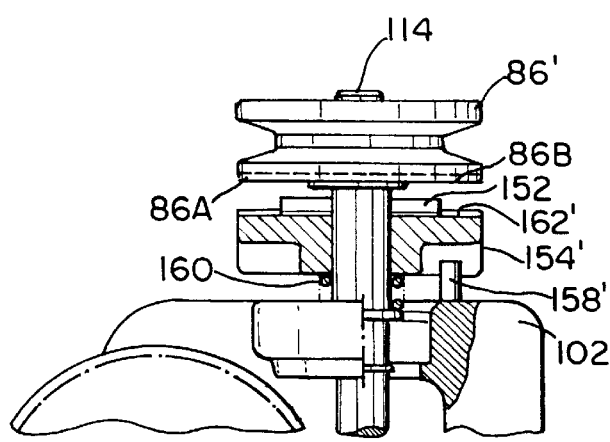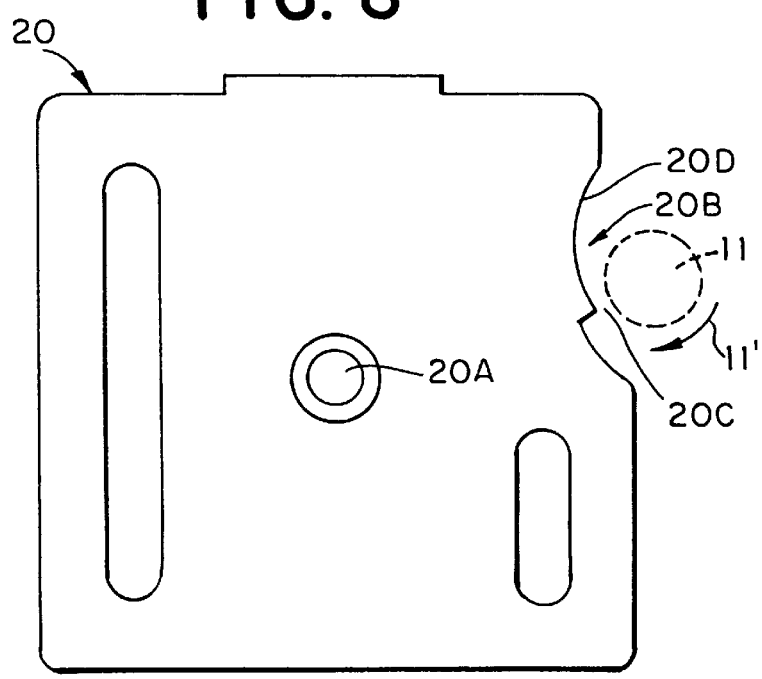

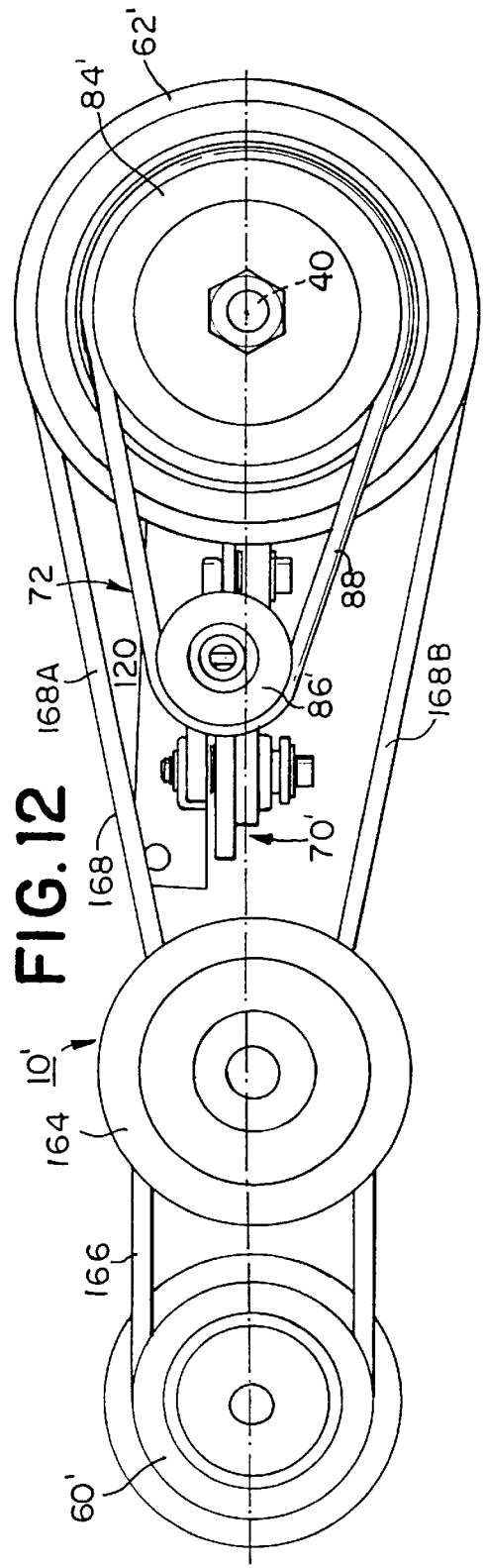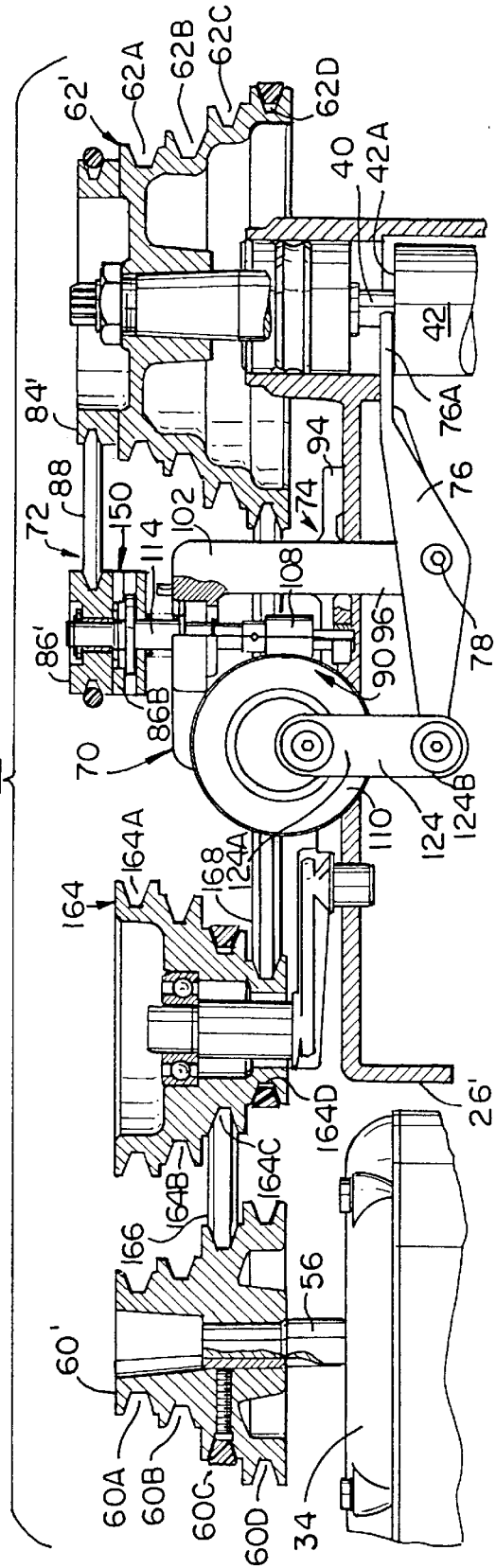

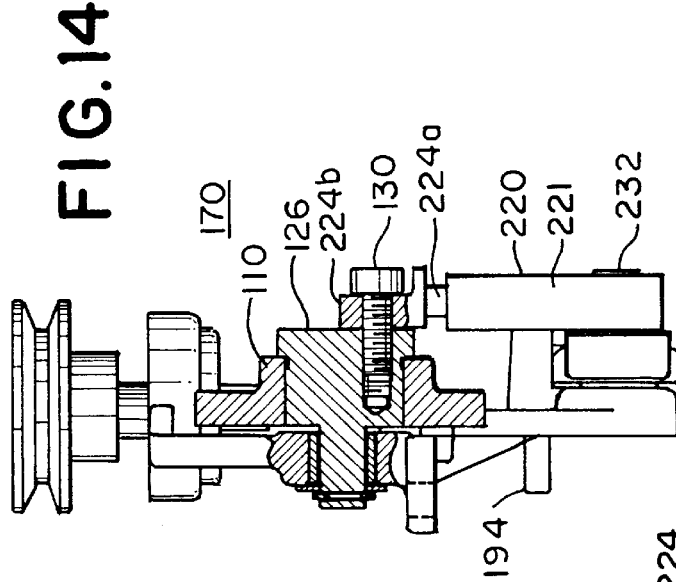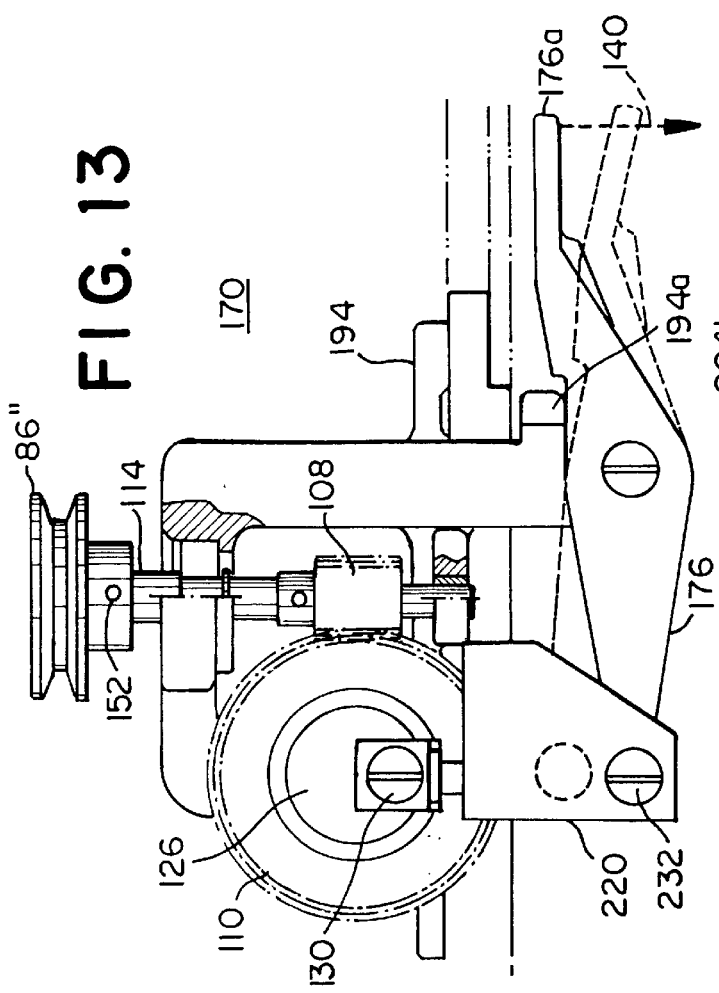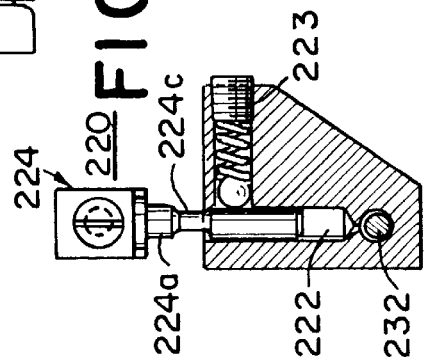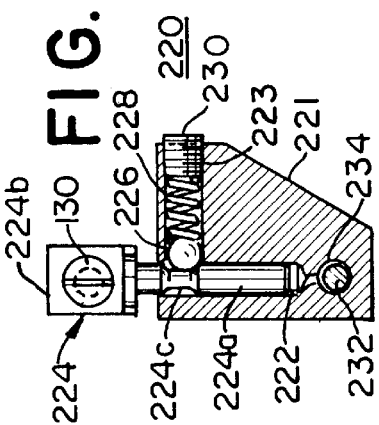

5,769,575

OSCILLATORY MOTION DEVICE FOR DRILL PRESS

FIELD OF THE INVENTION

The present invention relates to drill presses and, more particularly, to drill presses which have been modified to oscillate axially as well as rotate.

BACKGROUND OF THE INVENTION

Drill presses are popular machines for both domestic and industrial applications involving the drilling and/or shaping of metal, wood and other types of materials. One use of a drill press is to perform power sanding on a work piece, sometimes referred to as stock, in which a drum sander tool is clamped in the chuck of the drill press. The drum sander is rotated by the chuck which commonly rotates in a stationary location during the sanding operation. The drum sander tool used in this manner is disadvantaged in that only a relatively small portion of the tool may make contact with the workpiece. Sometimes unwanted deep horizontal grooves are imparted to the workpiece by particles of abrasive materials of the sander becoming disengaged. Also, parts of the drum sander always in contact with the workpiece fill very quickly. This requires the drum sander tool to be clean, repositioned or replaced. The possibility of unsightly horizontal lines or material buildup is reduced by an operator rocking on the feed lever of the drill press so that the sanding drum moves up and down in a stroking manner, thereby allowing more of the surface area of the drum sander tool to contact the workpiece thereby reducing the likelihood of disengagement of the abrasive materials from constant contact and overheating. Although manual rocking does reduce some of the drawbacks of the drill press in performing the sanding operations, it has the attendant drawback of being dependent upon the dexterity of an operator who must simultaneously manipulate the workpiece while manually rocking the feed lever.

Stand-alone or dedicated oscillating spindle sanders are also commercially available. Although such dedicated oscillating spindle sanders provide improved power sanding operation, relative to conventional drill presses, a dedicated sander must be separately purchased and requires extra shop space for use and storage. Furthermore, such devices often operate at a fixed speed, which may not be entirely desirable for all sanding operations.

An article, "Oscillating Drum Sander", in WORKBENCH, February-March, 1992, describes a drill press modified to obtain an up-down oscillation of the chuck while the chuck is provided its normal rotation. The oscillating up-down motion is provided by a separate motor mounted to the drill press column, driving a wheel connected by a cable to a pulley coupled with the key lever. Operation of the second motor and its wheel caused the cable connected to the feed lever to rotate and then subsequently release the feed lever in a repeated action thereby duplicating the action of an operator manually rotating and releasing the feed lever to obtain the same oscillation.

A kit for modifying the drill press so as to provide an oscillating chuck motion for sanding was also disclosed in the September, 1994 issue of WOOD MAGAZINE. This kit also includes a separate motor mounted on the drill press column driving an offset wheel supporting a connected rod coupled by a clamp to a spoke of the drill press feed lever. Rotation of the offset wheel caused an oscillating motion of the connecting rod corresponding oscillating motion of the spoke and feed lever.

The advantages of these conversion kits are offset by the cost of having to provide a separate motor. The motor raises the cost of these kits to a level comparable to the commercially available dedicated, stand-alone oscillating spindle sanders. It would be desirable to provide a modification to conventional drill presses which provide oscillating chuck motion for sanding of similar operations without the high attendant cost of the existing modifications.

SUMMARY OF THE INVENTION

In one aspect, the invention is a drill press having an axially oscillating chuck comprising: a motor having an output shaft; a driven shaft; a quill mounted on the driven shaft; a chuck mounted on one end of the driven shaft; a first drive coupling between the output shaft and the driven shaft; a rotating power take-off driven by one of the output shaft, the driven shaft and the first drive coupling; a lever having a first end coupled with the quill, the lever being mounted for movement of the first end with axial movement of the quill on the driven shaft; and a second drive coupling between the lever and the rotating power take-off.

In another aspect, the invention is a device for imparting oscillatory motion to a chuck mounted for rotation within and for axial movement with an axially movable quill of a drill press, the device comprising: a rigid frame; an input shaft rotatably supported on the frame; a rotary drive member; a clutch mounted to selectively engage the input shaft; a lever pivotally mounted to the frame having one end projecting sufficiently from the frame to engage an axially movable quill of a drill press; and a drive coupling extended between the rotatably supported input shaft and the pivotally mounted lever.

A drill press having an axially oscillating chuck comprising: a motor having an output shaft; a driven shaft laterally spaced from the output shaft; a quill mounted on the driven shaft for rotation of the driven shaft within the quill and for axial movement of the quill with the driven shaft; a chuck mounted on one end of the driven shaft; a first flexible drive coupling between the output shaft and the driven shaft, the flexible coupling including two spaced-apart legs extending generally between the output shaft and the driven shaft; an oscillatory motion device positioned in the drill press laterally between the output shaft and the driven shaft and between the legs of the first flexible drive coupling, the device being coupled with the quill so as to cyclically reciprocate the quill in an axial direction; a rotating power take-off driven by one of the output shaft, the driven shaft and the first flexible drive coupling; and a second drive coupling between the oscillatory motion device and the rotating power take-off.

BRIEF DESCRIPTION OF THE DRAWINGS

The foregoing summary, as well as the following detailed description of the preferred embodiments of the invention, will be better understood when read in connection with the appended drawings. For the purpose of illustrating the invention there is shown in the drawings embodiments which are presently preferred. It should be understood, however, that the present invention is not limited to the particular preferred arrangements and instrumentality shown.

In the Drawings:

FIG. 2a is a simplified local top plan view of the drive and driven pulley and belt of the drill press with the oscillatory motion device;

FIG. 8 is a diagrammatic top plan view of the work table of the drill press;

FIGS. 10a and 10b are views similar to FIGS. 9a and 9b, respectively, of the second embodiment device with the clutch assembly disengaged;

FIGS. 11 and 12 are simplified, diagrammatic side elevation and local top plan views, respectively, of an oscillatory motion device of the present invention installed in a conventional, twelve-speed drill press;

FIG. 13 is a simplified, diagrammatic, elevational view of a modified, attachable oscillatory motion device of the present invention;

FIG. 14 is a partially broken, elevational view of the left side of the device of FIG. 13;

FIG. 15 is a partially broken, side elevational view of a detent link showing the link in its engaged condition; and FIG. 16 is a view similar to FIG. 15 of the detent link in its released condition.

DETAILED DESCRIPTION OF PREFERRED EMBODIMENTS

Figure 1:
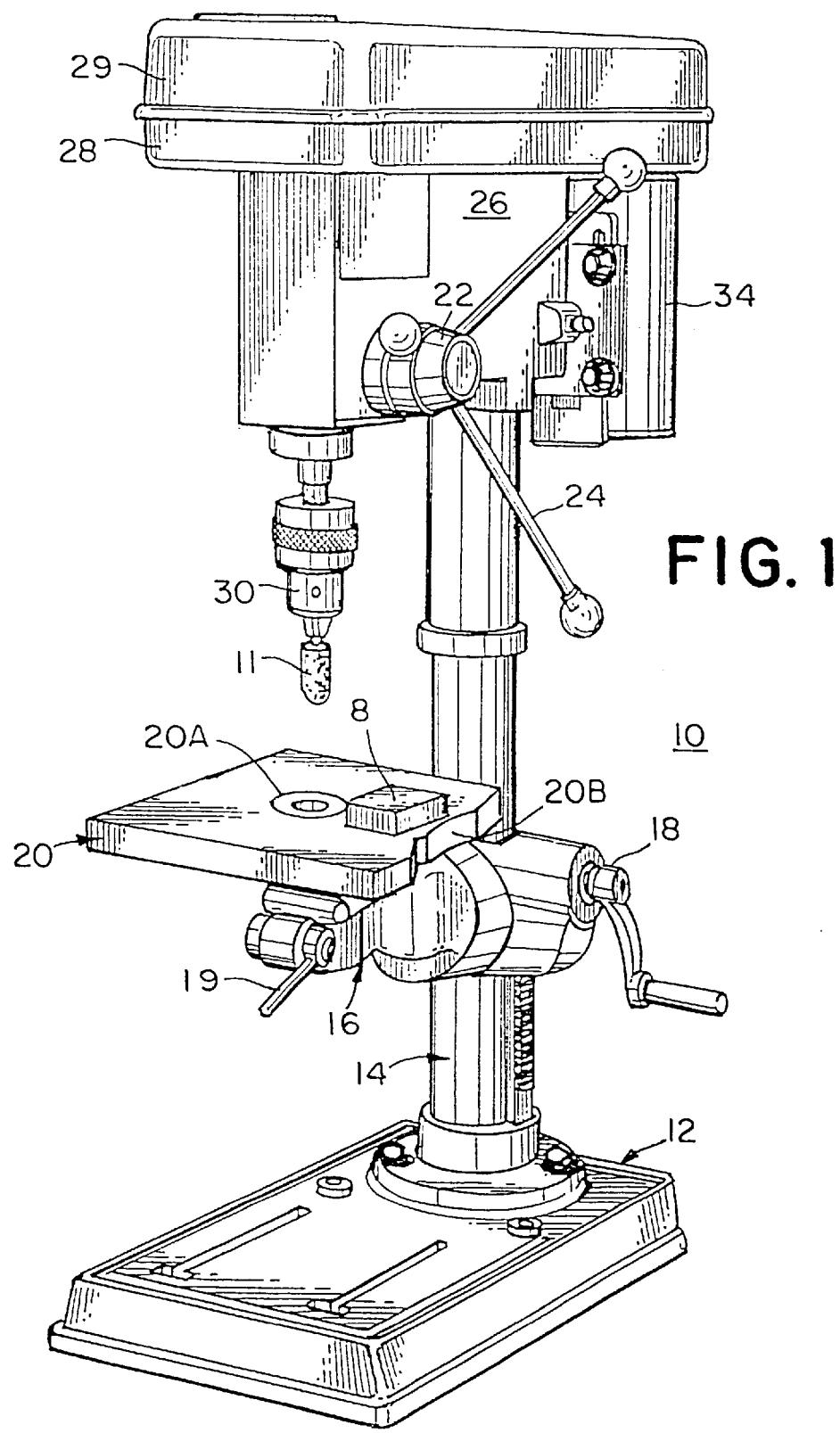
FIG. 1 is a perspective view of a conventional drill press modified by the addition of the attachable oscillatory motion device in the present invention.

Referring now to the drawings wherein like numerals are used to indicate like elements throughout, there is shown in FIG. 1, a drill press 10 as modified by the present invention to provide an oscillatory stroke to the chuck 30 for automatic vertical oscillation of an attached drum sander tool 11 in the drill press 10 as modified by the present invention so that the chuck 30 simultaneously rotates along its central vertical axis in a conventional fashion and automatically oscillates up and down along that axis to expose more of the surface area of the drum sander 11 clamped in the chuck 30 to a workpiece 8 (in phantom) being sanded.

Referring to FIG. 1, the drill press 10 comprises a base 12, a column 14, an arm 16, a crank 18 to vary the height of the arm 16 on the column 14, a table 20 at least pivotally supported on the column and a lever 19 for locking the table 20, which is supported on arm 16. Table 20 has a central opening 20A and, preferably, an opening in the form of a shaped recess or depression 20B along one side edge of the table 20 to receive tool 11. A feed or pilot lever 22 with spokes 24 is provided for moving the chuck 30 and any tool supported in the jaws 32 of the chuck 30 up and down. A head casting 26 movably supports a quill assembly or simply "quill", to be described with respect to the later figures. An upper housing 28 and removable cover 29 enclose a first or primary drive connection of the drill press 10, which is between the chuck 30 and a drive motor 34 supported from the head casting 26 on an opposing side of the column 14. Base 12, column 14 and head casting 26 collectively constitute frame supporting the other components of drill press 10.

Figure 2:
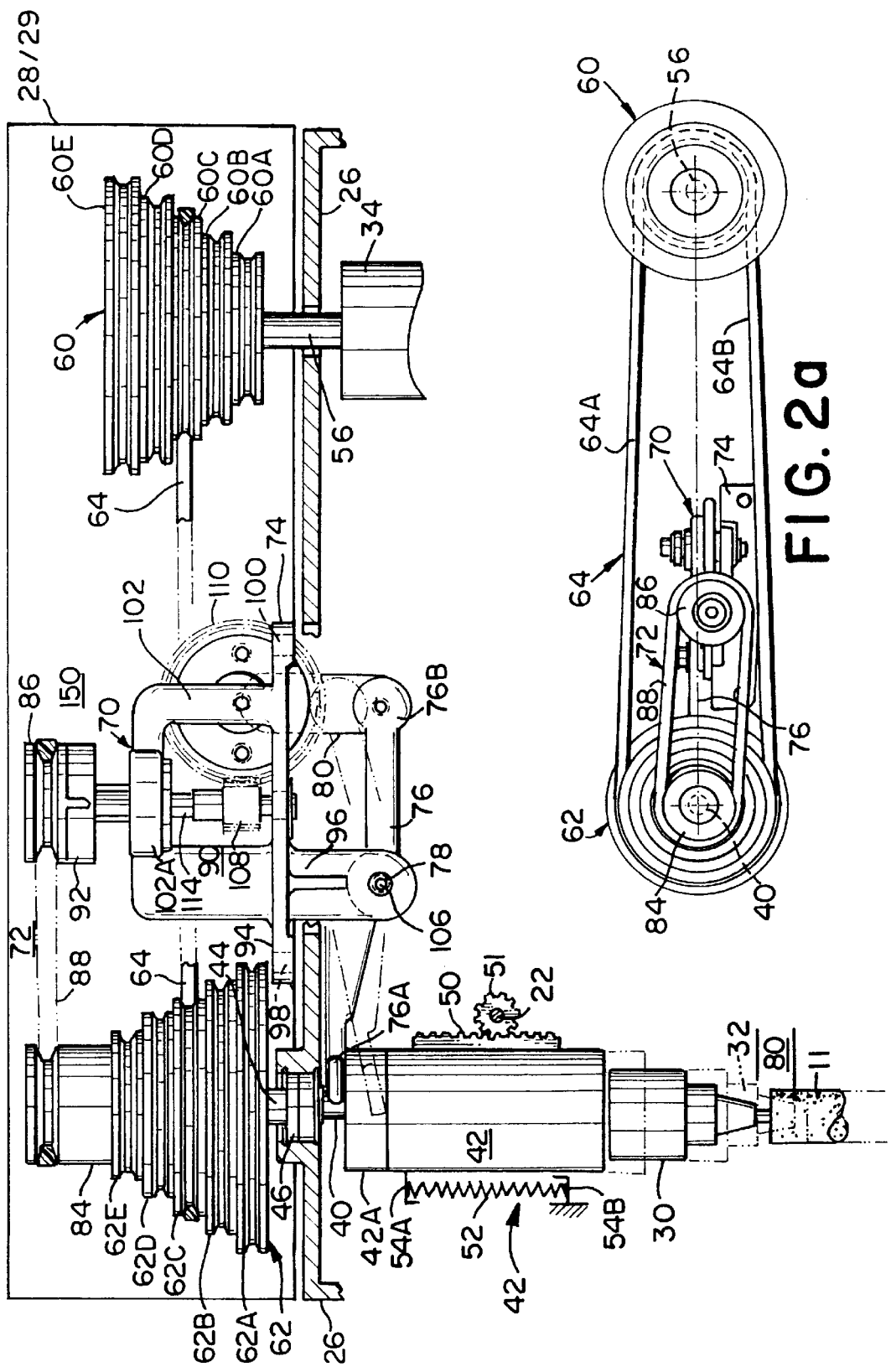
FIG. 2 is a simplified, diagrammatic, broken away side elevation of the driving and driven portions of the drill press in FIG. 1.

FIG. 2 depicts the driving and driven components of the drill press 10. Referring first to the conventional aspect of the drill press 10, a driven shaft 40, sometimes referred to as a spline shaft, is received in one end of a pulley drive sleeve 44, which is supported for rotation by bearings indicated generally at 46 and associated coupling and clamping components, which are conventional and omitted for clarity. The pulley drive sleeve 44 is internally splined to drivingly couple with splines on the upper end of driven shaft 40. The splines of the drive sleeve 44 and driven shaft 40 remain engaged over a range of axial movement of the driven shaft 40 within the drive sleeve 44. The quill is indicated generally at 42 and includes a tubular member 43 which is mounted on the driven shaft 40 and which is coupled with the driven shaft through bearings (not depicted) in the tubular member 43 in various ways known in the art. The bearings within the tubular member 43 of quill 42 permit the driven shaft 40 to rotate within the quill 42 and to be elevated and lowered by the quill when the quill is raised and lowered. In this way, the driven shaft 40 and its attached chuck 30 are mounted for rotation within and for axial movement with the exposed quill 42. The quill 42, in turn, moves axially with the driven shaft 40. The chuck 30 is mounted on an exposed lower end of the driven shaft 40 for axial movement with the quill 42 and rotational movement within the quill on the driven shaft 40.

The quill 42 also includes a rack 50 on the tubular member 43, which cooperates with a pinion 51 driven by the feed lever 22. The quill 42 further includes a return spring 52 having one end which is coupled to the tubular member 43 by being seated in a cup 54A, and a second end that is stationary by attachment to the head casting 26 by being seated in a cup 54B. The spring 52 biases the quill 42 upwardly. To lower the chuck 30, the feed lever 22 is rotated by any of its spokes 24 to rotate pinion 51 thereby forcing the quill 42 downward compressing the spring 52. Upon release of the spoke(s) 24, spring 52 expands and elevates the quill 42 back to its original, nominal position, which is indicated in solid in FIG. 2.

The first or primary drive coupling between the motor and the chuck 30 is shown in FIG. 2 and is conventional. Motor 34 has an output shaft 56, which is generally parallel to and laterally spaced apart from the driven shaft 40. In particular, motor output shaft 56 enters the upper housing/cover 28/29, where it drives a first cone pulley 60 mounted on and coupled with shaft 56. A second cone pulley 62 is fixedly attached to the pulley drive sleeve 44 above the quill 42. A flexible coupling member in the form of a belt 64 is extended between and around the first and second cone pulleys 60 and 62, drivingly coupling the pulleys together. The cone pulleys 60, 62 and belt 64 collectively constitute the major components of the first or primary drive coupling of drill press 10, which is provided between the output shaft 56 and the chuck supporting driven shaft 40.

The first cone pulley 60, which is the drive pulley, preferably has a plurality of steps 60A, 60B, 60C, 60D and 60E, which are arranged in a predetermined order in which the diameters of the steps 60A–60E increase as the steps extend away from the motor 34. Second cone pulley 62, which is the driven pulley, has a like plurality of steps 62A–62E, which are arranged in a second, opposing order in which the diameters decrease as the steps extend away from the chuck 30. The belt 64 may be connected between directly opposing pairs of the steps (e.g. 60C–62C, etc.), to provide a variety of different speeds utilizing a fixed speed motor 34. For example, the motor 34 may be of a ¾ hp rating at a predetermined rotational speed of about 1725 RPM, and the step diameters selected to provide multiple (i.e. five) chuck speeds of about 250 RPM to about 3100 RPM.

Added to the basic components of drill press 10 is the oscillatory motion device of the present invention, which is indicated generally at 70 in FIGS. 2–5, and a rotating power take-off, which is indicated generally at 72 in FIGS. 2 and 2A. Device 70 is coupled with quill 42 in a manner to be described so as to cyclically reciprocate the quill 42 in an axial direction, thereby oscillating chuck 30 up and down as it rotates.

Rotating power take-off 72 and device 70 are at least substantially entirely within located the upper housing/cover 28/29. As best seen in FIG. 2a, rotating power take-off 72 and device 70 are positioned in drill press 10 laterally between output shaft 56 and driven shaft 40 and between legs 64A and 64B of belt 64, which legs extend between pulleys 60 and 62 and generally between output shaft 56 and driven shaft 40.

The rotating power take-off 72 preferably is driven indirectly from the motor output shaft 56 and comprises a first take-off pulley 84, a second take-off pulley 86 and a flexible coupling member in the form of a belt 88 extended between and around the take-off pulleys 84 and 86, drivingly coupling the pulleys 84 and 86 together. Preferably, the first take-off pulley 84 is fixedly coupled with the second cone pulley 62 or to the pulley drive sleeve 44, if accessible. Of course, the first take-off pulley 84 could be connected with the driven shaft 40 or first cone pulley 60, if accessible and more convenient. In some instances, it may be desirable to supply a replacement cone pulley including an extra step to act as the take-off pulley. Although the rotating power take-off 72 includes a separate pulley 84 attached to the second cone pulley 62 or pulley drive sleeve 44, it should be recognized that the first take-off pulley may be provided, for example, by either of steps 60E or 62E with the drive belt 64 extended between others of the steps or from drive belt 64 itself if extended between the steps 62E and 60E and against take-off pulley 86. It should further be recognized that other, known, alternative drive couplings may be used to take rotary power from the motor output shaft 56, chuck driven shaft 40 or the drive coupling therebetween including but not limited to gears, other types of pulleys, cranks, rigid and/or flexible shafts, cables, chains and other conventional mechanical elements and even hydraulic couplings.

Second take-off pulley 86 is preferably provided as an integral part of the preferred device 70. The preferred device 70 further includes a rigid frame 74 pivotally supporting a lever 76. The first end 76A of the lever 76 is extended into a space provided between the head casting 26 and the top portion 42A of the quill 42, where the end 76A is engaged or coupled with the quill 42 by overlapping the top end 42A of the quill 42. Lever 76 is pivotally mounted to frame 74 by means of a pivot pin 78 so as to provide over a limited range, an at least generally linear movement of the first end 76A which, in turn, correspondingly causes or permits the downward and upward axial vertical movement of the quill 42 with driven shaft 40. The extent of the linear movement or travel of the quill 42 caused by lever 76 is indicated by reference numeral 80 and the elements which undergo this travel are illustrated in FIG. 2 by phantom representations. These include, in addition to lever 76 and quill 42, the chuck 30, jaws 32 and any tool such as drum sander tool 11 in the jaws 32.

The device 70 preferably further includes a second drive coupling indicated generally at 90, which is provided between the second take-off pulley 86 end of the power take-off 72 and the pivoting lever 76. A clutch assembly of simply "clutch" indicated generally at 150 is preferably provided between the second take-off pulley 86 end of the rotating power take-off 72 and the input shaft 114 of the second drive coupling 90. The pulley 86 and clutch 150 are all rotatably supported on the frame 74 by input shaft 114. The frame 74 includes a base 94 supporting a downwardly extending arm 96 receiving the pivot pin 78 supporting the lever 76. Openings 98 and 100 are provided through the base 94 for securing the base to the bottom of the upper casting by means of bolts or other fasteners (none depicted). Frame 74 further includes an upper inverted "U"-shaped arm 102, which supports components of the second drive coupling 90. The second drive coupling 90 converts the rotary motion of the second take-off pulley 86 into a motion oscillating the end 76A of the lever 76 up and down as the chuck 30 is rotated. Details of the second drive coupling can be seen in greater detail in FIGS. 3 through 5.

The second drive coupling 90 is preferably provided by a first gear indicated diagrammatically at 108, preferably a worm, and a second gear indicated diagrammatically at 110, preferably a conventional worm gear, engaged with the worm 108. Worm 108 and worm gear 110 provide a rate of oscillation which is significantly less than the rate of rotation of the driven shaft 40 and chuck 30. The worm 108 is preferably formed or mounted on input shaft 114, a lower end of which is received in a bearing journal 116 provided in the base 94. The upper end of shaft 114 is supported in a second bearing indicated generally at 102A in the upper arm 102 of the frame 74. The remaining end of the shaft 114 extends above the arm 102 and receives and supports the second take-off pulley 86 for free rotation thereon. The pulley 86 may be retained on the end of the shaft 114 by conventional means such as a spring clip 118 over a washer 119. Preferably, the uppermost end of the shaft 114 is provided with a slot 120, the use of which will be later explained. The pulley 86 may be supported on a bearing 122 for improved rotation and life, if desired.

The second drive coupling 90 further preferably includes an arm 124 having a first end 124A eccentrically coupled with the worm gear 110 and a second end 124B rotatably coupled with the remaining end 76B of the lever 76. A preferred construction is shown in the figures, particularly FIG. 5. The worm gear 110 is preferably mounted on a separate hub 126, which is supported in a bearing 128 through one side of the upper arm 102 of the frame. The first end 124A of the arm 124 is rotatably secured in an eccentric off-center position by suitable means such as a bolt 130, washer 132 and stand off washer 134. The remaining end 124B of the arm 124 is similarly pivotally coupled by another bolt 130, washer 132 and stand-off washer 134 to the remaining end 76B of the lever 76.

The eccentric attachment of arm 124 causes the arm to translate the purely circular, rotational motion of the gear 110 into a reciprocating, generally linear vertical motion at the end 76B of the lever 76. Rotation of the gears 108 and 110 causes the arm 124 to be raised in the direction of arrow 138 raising end 76B of the lever 76 and forcing the first end 76A down in a direction of arrow 140 causing the quill 42, chuck 30 and tool 11 to be forced down to the phantom position indicated in FIG. 2. As the gears 108 and 110 continue to rotate, the arm 124 is forced down in the direction of arrow 142 to the position again indicated in solid end FIG. 3 raising the first end 76A of the lever upward in the direction of arrow 144 releasing the quill 42 and allowing it to be biased back to its original position by spring 52. Preferably the gears 108 and 110 are selected to provide a ratio which provides a predetermined oscillating frequency of the lever 76 given the power take-off from which it is operated. An oscillating frequency of from about 10 to about 70 cycles per minute may be provided.

Figure 3:
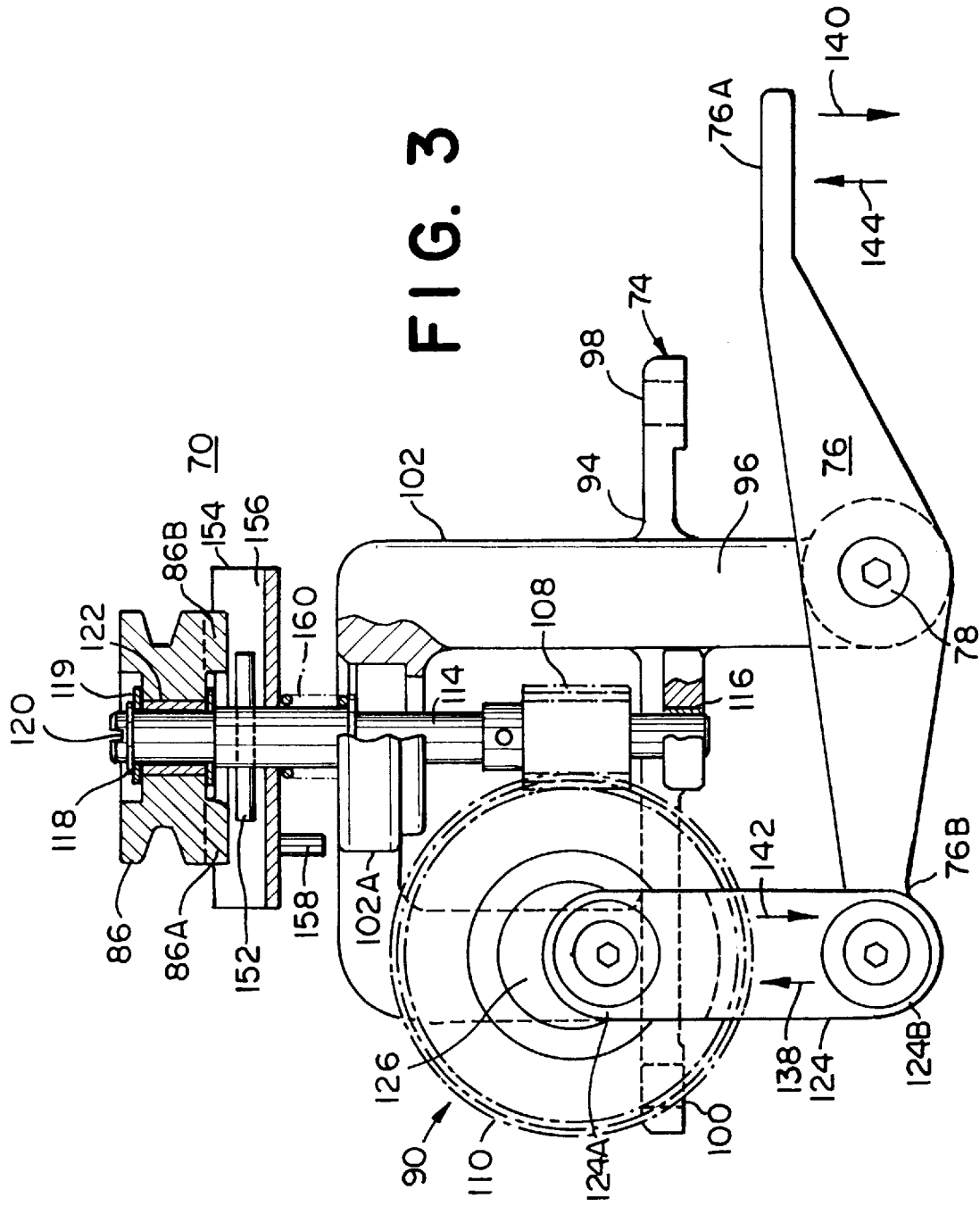
FIG. 3 is a simplified, diagrammatic, side elevation of the attachable oscillatory motion device in the present invention.
Figure 4:
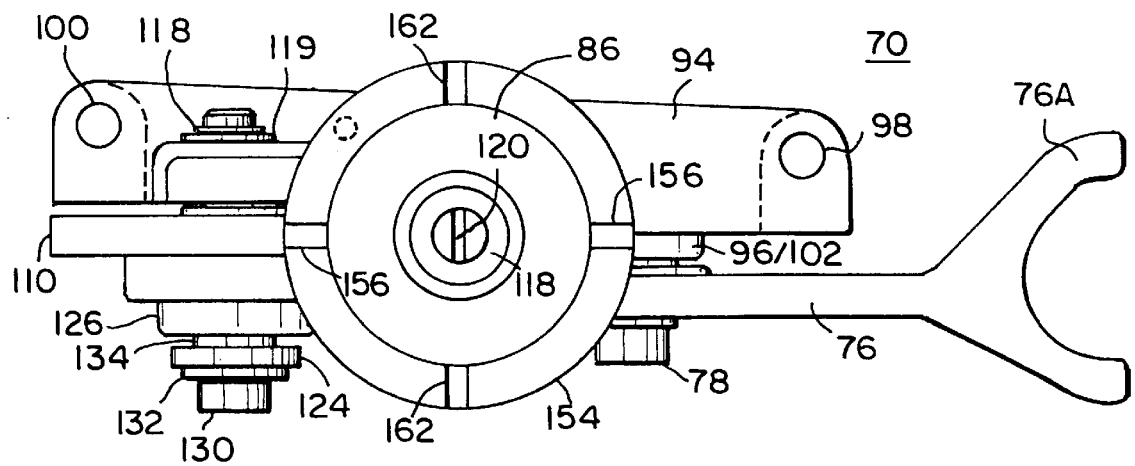
FIG. 4 is a simplified, diagrammatic, top plan view of the device in FIG. 3.
Figure 5:
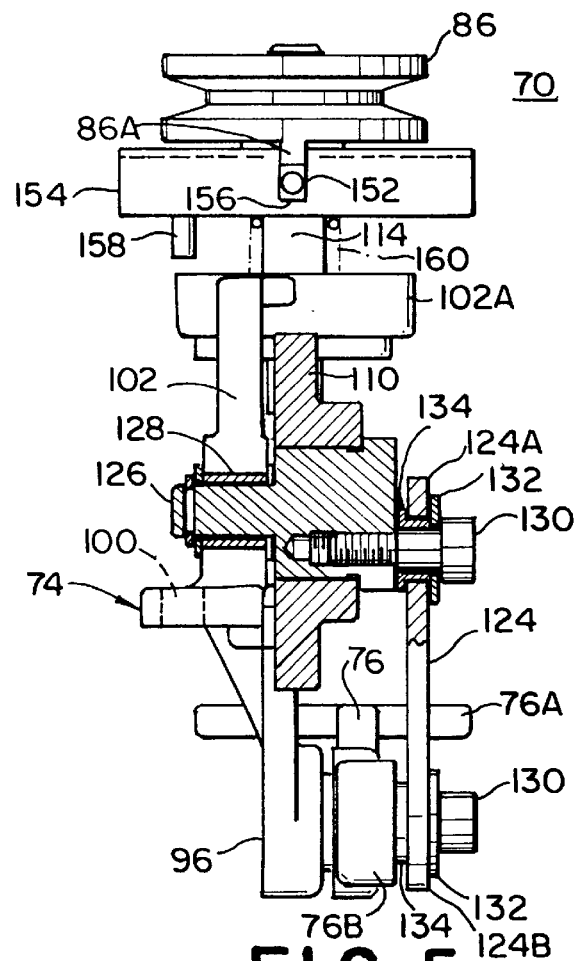
FIG. 5 is a simplified, diagrammatic, elevational view of the device of FIG. 3 from an opposing side of the device.

Referring to FIGS. 3 and 5, the clutch 150 is preferably provided in part by take-off pulley 86 and by a pin 152, which is fixedly staked through the shaft 114, a collar 154 and a spring 160 indicated diagrammatically in phantom, each of which is positioned around the shaft 114 between the upper arm 102 of the frame and the collar 154. Spring 160 is located to bias collar 154 towards the second take-off pulley 86. Collar 154 is preferably provided with a diametrically extending slot 156 facing take-off pulley 86. It further is provided with a downwardly extending tab 158. Take-off pulley 86 also is provided with a pair of diametrically positioned, downwardly extending tabs 86A and 86B, which are received in the slot 156 of collar 154 simultaneously with pin 152 for simultaneous interference engagement with the collar 154. Once the tabs 86A and 86B are interferingly engaged with the slot 156, the collar 154 is maintained in engagement with the tabs 86A and 86B by the upward bias of the spring 160. In this way, the second take-off pulley 86 becomes fixedly coupled to the shaft 114 through the simultaneous engagement of the tabs 86A, 86B and the pin 152 with the collar 154.

Figure 6:
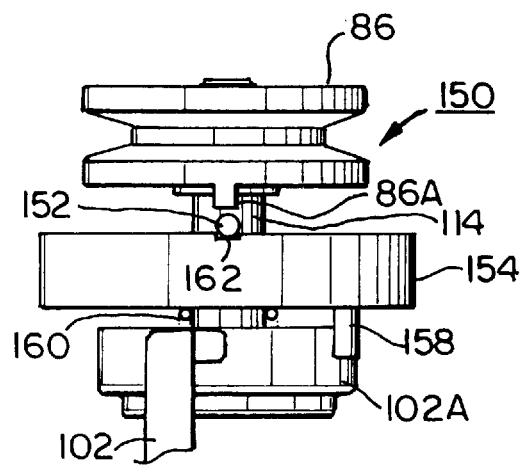
FIG. 6 is a simplified, diagrammatic, elevational view of a clutch assembly of the device of FIGS. 3–5 in a non-engaged condition.
Figure 7:
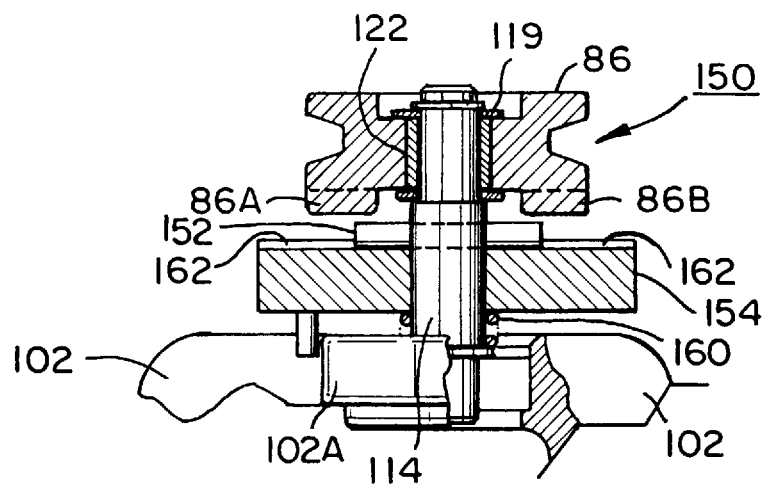
FIG. 7 is a partially broken away view from the right side of FIG. 6.

Referring now to FIGS. 6 and 7, when it is desired to disconnect the device 70 from the rotating power take-off 72, the cover 28 is removed from the drill press and the collar 154 depressed and rotated sufficiently to engage the tab 158 with a portion of the arm 102 of the frame 74 and the pin 152 with notches 162, which are angularly offset at right angles to the slot 156 along the upper periphery of the collar 154. Engagement between pin 152 and notches 162 is maintained by spring 160. The notches 162 are sized to receive only the pin 152 and neither of the pulley tabs 86A, 86B. If need be, the input shaft 114 can be held stationary by applying a screwdriver to the slot 120 in the top of the shaft 114. In the disengaged position of the clutch assembly 150 indicated in FIGS. 6 and 7, take-off pulley 86 is allowed to freely rotate on the end of shaft 114. Tab 158 assists in maintaining that shaft 114 stationary through the collar 154 and pin 152 by contacting arm 102.

In operation, the power take-off 72 is coupled with the device 70 by coupling the take-off pulleys 84, 86 together with belt 88 and coupling pulley 86 to the shaft 114 through pin 152 and collar 154. Take-off pulley 86 is rotatably engaged with input shaft 114 of the second drive coupling 90 by positioning collar 154 to simultaneously receive pin 152 and tabs 86A, 86B in slot 156. Main belt 64 is coupled between selected stages 60A–60E and 62A–62E of the two cone pulleys 60, 62. The chuck 30 of FIG. 1 is adjusted so that its jaws 32 accept and then clamp the shaft of a drum sander tool 11 or other tool or attachment (not shown). The table 20 is then positioned so that the central opening 20A or side opening 20B of table 20 is aligned to the downwardly extending drum sander 11, thereby allowing the drum sander to vertically move in and out of the opening 20A or 20B. Workpiece 8 is then moved into the general region of the opening 20A or 20B to contact sander 11.

Current Underwriters Laboratories standards for safety require that a clearance between the work surface of the table and any drum sander used in connection with the table be no greater than ¹⁄₁₆ inch. This assures that an injurious pinch point is not created between the sanding drum and the adjoining table opening. If central opening 20A is used for sanding, under the UL standard, each diameter sanding drum requires a table insert. In other words, if sanding drums of ½, ¾, 1, 1½ or 2 inches in diameter are used in the drill press 10, then ring-shaped table inserts with openings ⅝, ⅞, 1⅛, 1⅝ and 2⅛ inch diameter must be supplied, one for each different diameter sanding drum.

However, as indicated in FIG. 8, table 20 can be positioned so that only a single potential pinch point at 20C is defined between the drum sander tool 11 (in phantom) and the adjoining table 20. Spacing of the table 20 from the tool 11 can be adjusted down to the ¹⁄₁₆ inch clearance required by the standard. Surface 20D of opening 20B of work table 20 directly faces the tool 11 and is scalloped and generally concavely curved sufficiently to accommodate any conventionally sized drum sander tool with a spacing of ¹⁄₁₆inch or less at the potential pinch point 20C. Point 20C is where a scalloped peak of the surface 20D of the table 20 laterally adjoins the chuck 30 and tool 11, which is rotating in the direction of arrow 11', and is first encountered by that tool 11.

The drill press 10 is then activated by turning on the press drive motor 34. The first drive coupling provided by cone pulleys 60, 62 and belt 64 rotate chuck 30 through the pulley drive sleeve 44 and driven shaft 40. Rotation of the second cone pulley 62 operates the rotary power take-off 72 powering the device 70 to pivot lever 76. End 76A of the lever 76 alternately forces quill 42 downward then returns to its original elevated position allowing the quill 42 to be biased to its original elevated position by spring 52. Thus, the second drive coupling 90 of device 70 interacts with the quill 42 of the drill press 10 so as to provide an up-down oscillating movement of the chuck 30 and the drum sander 11 in addition to the rotational movement provided by first drive coupling of the drill press. The oscillating action allows for a typical vertical stroke of about ¾ inch and causes a larger surface area of the drum sander 11 to participate in the sanding operations. This not only provides for improved sanding but also increased operational life of the drum sander.

Figure 9B:
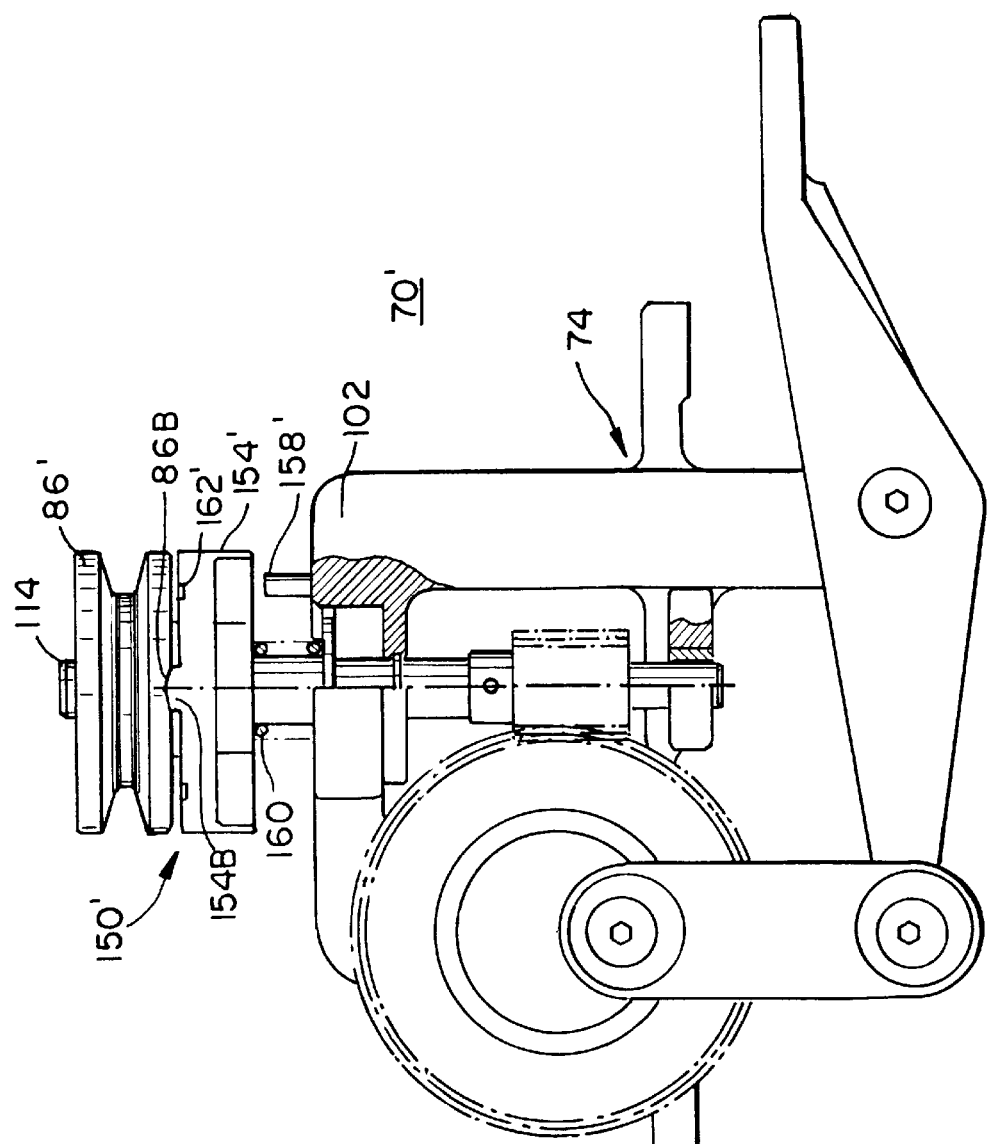
FIGS. 9a and 9b are partially broken away, side elevational views of a second embodiment oscillatory motion device incorporating a modified clutch assembly, which is engaged in the figures.
Figure 9A:
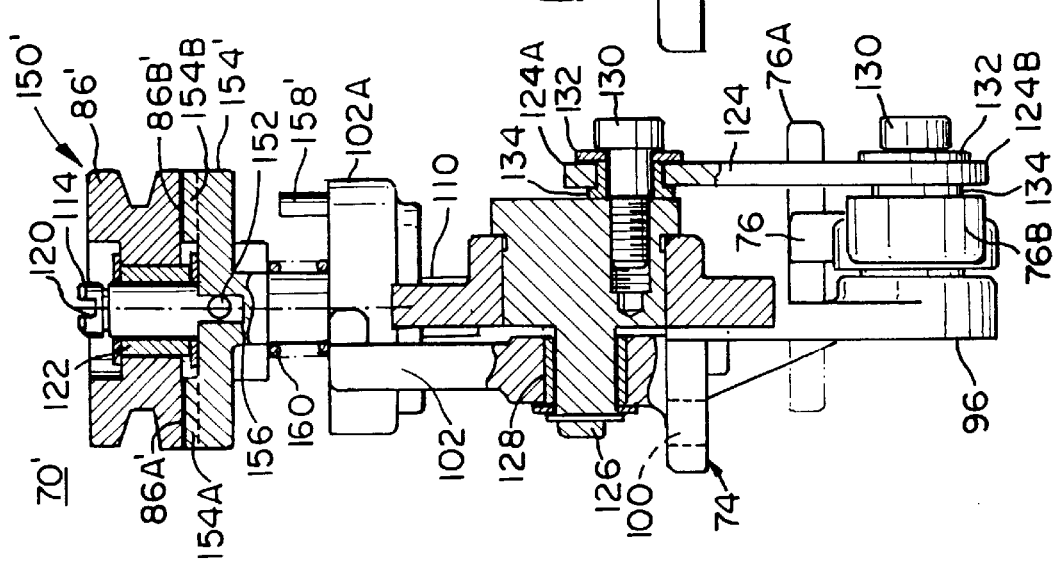

As shown in FIGS. 9a and 9b, a second, preferred embodiment clutch assembly indicated generally at 150' may be alternately provided between a modified second pulley 86' of the rotary power take-off and the input shaft 114 of the second drive coupling 90 of a modified oscillatory motion device 70' of the present invention. Apart from the modified clutch assembly 150', device 70' is identical to first embodiment device 70 of FIGS. 2–7. The modified clutch assembly 150' is preferably also provided by a pin 152, which is fixedly staked through the shaft 114, a modified collar 154' and spring 160, which is again positioned around the shaft 114 between the upper arm 102 of the frame and the collar 154', upwardly biasing the collar 154' towards the second take-off pulley 86'. Collar 154' again is preferably provided with diametrically extending slot 156. Take-off pulley 86' also is provided with a pair of diametrically positioned, downwardly extending slots 86A and 86B, which receive upward extending tabs 154A and 154B of collar 154' simultaneously with pin 152 received in slot 156. The pin 152 is maintained in engagement with slot 156 and the collar 154' is maintained in engagement with the collar tabs 154A and 154B in slots 86A and 86B by the upward bias of the spring 160. In this way, the second take-off pulley 86' becomes fixedly coupled to the shaft 114 through the simultaneous engagement of the tabs 154A, 154B and the pin 152 with the collar 154'. When it is desired to disconnect the device 70' from the rotating power take-off 72, the cover 28 is removed from the drill press and the collar 154' depressed and rotated sufficiently to engage the tab 158', now supported on the arm 102 of the frame 74, with collar 154' and the pin 152 with notches 162', which are angularly offset to one another and to the slot 156 and the tabs 154A, 154B along the upper periphery of the collar 154'. Engagement between pin 152 and notches 162' is maintained by spring 160. This disengaged position of the clutch assembly 150' is shown in FIGS. 10a and 10b. If need be, the input shaft 114 can be held stationary by applying a screwdriver to the slot 120 in the top of the shaft 114. In the disengaged position of the clutch assembly 150' indicated in FIGS. 10a and 10b, take-off pulley 86' is allowed to freely rotate on the end of shaft 114. Tab 158' assists in maintaining that shaft 114 stationary through the collar 154' and pin 152.

In operation, the power take-off 72 is coupled with the device 70' by coupling the take-off pulleys 84, 86' together with belt 88. Take-off pulley 86' is rotatably engaged with input shaft 114 of the second drive coupling 90 by positioning collar 154' to simultaneously receive pin 152 in slot 156 and tabs 154A and 154B in slots 86A and 86B of take-off pulley 86'. Main belt 64 is coupled between selected stages 60A–60E and 62A–62E of the two cone pulleys 60, 62. The chuck 30 of FIG. 1 is adjusted so that its jaws 32 accept and then clamp the shaft of a drum sander tool 11 or other tool or attachment (not shown). The table 20 is then positioned, using crank 18 and lever 19, so that the central opening 20A or 20B of table 20 is aligned to the downwardly extending drum sander 11, thereby allowing the drum sander to vertically move in and out of the opening 20A or 20B. Work piece 8 is then moved into the general region of the opening 20A or 20B to contact sander 11.

When input torque exceeds the allowable limit, modified clutch 150' operates in the following manner to prevent damage to the oscillatory motion device 70 and/or injury to operators. As input torque increases above limit, angled slots 86A and 86B in pulley 86' override angled tabs 154A and 154B in collar 154'. This forces collar 154' to slide down shaft 114 compressing spring 160. As long as torque required to work oscillatory motion device 70' exceeds the limit set by the strength spring 160, no oscillating motion will occur. Pulley 86' will spin and collar 154' will only slide up and down shaft 114 not transmitting rotary power to shaft 114 through pin 156.

FIGS. 11 and 12 depict diagrammatically the provision of either oscillatory motion imparting device 70' of the previous figures in a conventional 12-speed drill press indicated generally at 10'. Drill press 10' again includes drive motor 34 with motor output shaft 56 which supports for rotation a modified first, drive cone pulley 60'. A modified second, driven cone pulley 62' is attached to the pulley drive sleeve 44 above quill 42. However, instead of a single belt connecting the drive and driven cone pulleys 60', 62', an idler cone pulley 164 is provided longitudinally between the first and second, drive and driven cone pulleys 60', 62'. Each of the pulleys 60', 62' and 164 is provided with four steps A–D from top to bottom. A first belt 166 is provided between B—B as shown or between other selected adjoining steps A—A, C—C, or D—D of first cone pulley 60 and idler pulley 164. A second belt 168 is provided between a remaining one of the steps A–D of idler pulley 164 and a like step of second cone pulley 62'. In all, the four steps of each of the pulleys 60', 62' and 164 provide twelve possible belt and speed combinations between the drive motor/first drive cone pulley combination 34/60' and the driven shaft/second driven cone pulley combination 40/62'. Rotating power take-off 72 again provided by a separate pulley 84 attached to the second cone pulley 62' or pulley drive sleeve 44 and second take-off pulley 86' provided as part of the device 70'. As can be seen from FIGS. 11 and 12, device 70' is again positioned laterally between drive and driven pulleys 60', 62' of the drill press 10' and within or between the legs 168A, 168B of the drive belt 168 encircling and driving the driven shaft 40 supporting the tool 11. Of course, device 70 could be substituted for device 70'.

FIGS. 13 and 14 depict in mutually perpendicular side elevational views, a modified oscillatory motion device of the present invention which is indicated generally at 170. The major differences between modified device 170 and original device 70 is that the modified device 170 includes a modified base indicated at 194, a modified lever 176 and the substitution of a releasable coupling, preferably in the form of a tension limiting link indicated generally at 220, for arm 124 to releasably couple lever 176 with the rotating hub 126.

Referring to FIG. 15, the tension limiting link 220 includes a detent block 221 depicted in cross section and having a vertical bore 222 extending downwardly from a top surface thereof and a horizontal bore 223 extending from a lateral surface thereof and intersecting the vertical bore 222. The vertical bore 222 slidably receives an arm 224, more particularly, a portion of the arm in the form of a rod or pin 224a. An exposed upper end of the arm 224 is provided by an L-shaped bracket piece 224b. Bracket piece 224b is fixed on the upper end of rod 224a is rotatably attached to the hub 126 at an eccentric position, off-center from the rotational axis of the hub 126, by suitable means such as a threaded fastener 130 passed through a bore in the vertical portion of the bracket piece 224b in a manner like that previously described.

The detent rod 224a of arm 224 further includes an engagement structure, more particularly a depression, preferably in the form of a circumferential groove 224c. A ball 226 is supported on detent block 221 located in horizontal bore 223 and is biased by a spring 228 also in bore 223 against detent rod 224a mating into releasable engagement with the engagement structure groove 224c to releasably engage the detent rod 224a with the detent block 221. The ball 226 and spring 228 are retained in the bore 223 by suitable means such as a set screw 230. The detent block 221 is pivotally secured with one end of the lever 176 by suitable means again such as a fastener 232 passed through a transverse bore 234 through the detent block 221 and into the proximal end of lever 176.

The tension limiting link 220 operates as follows. The remaining "free end" 176a of the lever 176 is coupled with the drill press quill (not depicted). The quill is spring biased upward. Accordingly, the device 170 oscillates the quill by lifting the end of the lever 176 coupled through the tension limiting link 220 with the rotating worm gear 110 and hub 126. The maximum force the detent rod 224 is subjected to is a tensile force while depressing the quill in the direction indicated by arrow 140. The quill is raised by its own spring when the downward force applied by lever 176 is removed. The tensile force, which can be sustained by the tension limiting link 220, is adjustable and governed by the spring force holding the ball 226 engaged with the groove 224c. The tension limiting link 220 should be adjusted to sustain a predetermined tensile force at least as great as the maximum tensile force expected to be required to oscillate the quill in normal operation employing the automatic oscillating device 170. As tensile force on the link 220 increases towards the predetermined value, the detent rod 224 starts to release engagement with ball 226. The lip of engagement structure groove 224b pushes the ball 226 back into horizontal groove 223 compressing spring 228. When the predetermined tensile force is reached, ball 226 is completely pushed from the engagement structure groove 224b thereby allowing rod 224 to slide vertically in vertical bore 222. FIG. 15 depicts the tension limiting link 220 in an engaged or set condition. FIG. 16 depicts the same link 220 in a released condition. In the released condition, no power is transferred from the worm gear 110 and its hub 126 to the lever 176 and no vertical oscillation of the quill (not depicted) occurs.

After the link 220 has released, if the tension force required to oscillate the quill returns to a level below the predetermined value, the link 220 will reset as follows. As hub 126 rotates, it pushes lever 176 against a link reset tab 194a, which protrudes from the base 194 of the device 170. Base 194 is otherwise the same as base 94. Tab 194a stops the lever 176 from rising further. This, in turn, fixes the detent block 221 in its lowermost nominal position. As the hub 126 rotates, it pushes rod 224a back down into the vertical bore 222 and, at the bottom of its rotation, positions the engagement structure groove 224c of the rod directly opposite the ball 226, as shown in FIG. 15, thereby permitting the ball 226 to reengage with that groove 224c. If the resistive force provided by the quill is below the predetermined value, the ball 226 and engagement structure groove 224c will maintain engagement, oscillating the lever 176 on its pivot, thereby raising and lowering the quill. If the resistive force provided by the quill on the free end 176a of the lever 176 still exceeds the predetermined tension force value "breaking" the link 220, groove 224c again disengages from ball 226. If the tensile force on link 220 required to depress the quill is less than the predetermined tensile force, the rod 224a remains fixedly engaged for movement with the detent block 221 through the ball 226 or other provided mating engagement member. If the required force is equal to or greater than the predetermined tensile force, then the groove 224c will again force ball 226 back into bore 223 and will permit the rod 224a to partially withdraw from vertical bore 222.

It should now be appreciated that the practice of the present invention provides for a drill press 10 having an oscillating mechanism to allow for an oscillating stroke to improve sanding operations. Further, the drill press 10 of the present invention by means of the first drive coupling allows for multiple speeds, for example, up to twelve, to adapt the speed of the drum sander to the workpiece being sanded. Further, the upper housing/cover combination 28/29 of the drill press 10 not only accommodates the first drive coupling but also accommodates the rotary power take-off 72 and device 70, 70' or 170 of the present invention between the drive and driven pulleys of the drill press and within their connective belt(s). Such a provision allows for a drill press 10 to accommodate not only conventional drilling operations, but also the improved oscillating sanding operations and does so without any increase in the work space that must be made available to perform these functions.

Any of the devices 70, 70' and 170 and rotary power take-off 72 of the present invention may be provided as a kit to retrofit existing drill presses so that the retrofitted drill press has the benefits of the present invention of allowing for an oscillating stroke to improve the sanding operations performed by a drill press.

The present invention is also intended to cover conventional mechanical arrangements which are known substitutes for the mechanical elements shown in any of the devices 70, 70' or 170. For example, instead of a worm and worm gear, bevel gears might be provided. In place of the eccentrically coupled arm 124, a cam and linearly moving, spring loaded cam follower might be provided to oscillate lever 76. The invention is further intended to cover other cam, crank, toggle and linkage arrangements known for converting rotary motion into reciprocating linear motion. It will be recognized by those of ordinary skill in the art such arrangements may be substituted for those of the preferred embodiments even though they may differ from the preferred embodiments in complexity, cost, accuracy of motion, etc.

It will be appreciated by those skilled in the art that changes and modifications may be made to the above-described embodiments without departing from the inventive concept thereof. It is understood, therefore, that the present invention is not limited to particular embodiments disclosed, but is intended to include all modifications and changes that are within the scope and spirit of the invention as defined by the appended claims.

What is claimed is:

1. A drill press having an axially oscillating chuck comprising:

a frame;

a motor having an output shaft;

a driven shaft;

a quill mounted on the driven shaft;

a chuck mounted on an end of the driven shaft;

a first drive coupling between the output shaft and the driven shaft;

a rotating power take-off driven by one of the output shaft, the driven shaft and the first drive coupling;

a lever having a first end coupled with the quill, the lever being mounted for movement of the first end with axial movement of the quill on the driven shaft; and a second drive coupling between the lever and the rotating power take-off;

wherein the quill is movably supported on the frame and the motor is fixedly supported on the frame with the output shaft and the driven shaft parallel and laterally spaced apart from one another.

2. The drill press according to claim 1, wherein said second drive coupling comprises:

a rotating member; and an arm eccentrically coupled at a first end to said rotating member and at a second end to said lever so as to translate rotational movement of said rotating member into generally linear movement at the second end of said arm.

3. The drill press according to claim 1 further comprising a clutch between said second drive coupling and said rotating power take-off.

4. The drill press according to claim 3, wherein said rotating power take-off comprises a take-off pulley rotatably attached to an input shaft of said second drive coupling.

5. The drill press according to claim 4, wherein said clutch comprises:

(a) a pin located below said take-off pulley and fixedly attached to said input shaft of said second coupling;

(b) a collar located below said take-off pulley and around said input shaft of said second coupling and having at least one slot dimensioned to receive said pin;

(c) a member on at least one of the take-off pulley and the collar extending into interference engagement with the remaining one of the take-off pulley and collar; and (d) a spring located to bias said collar toward said pin and said take-off pulley.

6. The drill press according to claim 5, wherein said collar further comprises a groove angularly offset from the slot, facing toward said take-off pulley.

7. The drill press according to claim 1, wherein said first drive coupling comprises a pulley coupled to rotate with one of said output shaft of said motor and said driven shaft; and wherein said rotating power take-off comprises a take-off pulley coupled to rotate with said first drive coupling pulley.

8. The drill press according to claim 7, wherein said first drive coupling pulley has a plurality of steps of different diameters arranged in a predetermined order.

9. The drill press according to claim 1 wherein the rotating power take-off includes a rotating member and further wherein the drill press comprises:

an arm having a first end coupled with the rotating member for at least some translational movement of the arm with rotation of the rotating member; and a releasable coupling between a second end of the arm and a second end of the lever opposing the first end of the lever.

10. The drill press according to claim 9 wherein the releasable coupling comprises:

a block secured with the second end of the lever, the block further including a bore receiving the second end of the arm; and a mating member on the block releasably engaged with the second end of the arm releasably coupling the arm with the block.

11. A device for imparting oscillatory motion to a chuck mounted for rotation within and for axial movement with an axially movable quill of a drill press, the device comprising:

a rigid frame;

an input shaft rotatably supported on the frame;

a clutch mounted to selectively engage the input shaft;

a lever pivotally mounted to the frame and having one end projecting sufficiently from the frame to engage an axially movable quill of a drill press; and a drive coupling between the rotatably supported input shaft and the pivotally mounted lever.

12. The device according to claim 11, wherein said coupling comprises:

a worm on the input shaft;

a worm gear engaged with the worm; and an arm coupled at one end with said worm gear for at least some translational movement with rotation of the gear and rotatably coupled at a remaining end with said lever.

13. The device according to claim 12, wherein said clutch comprises:

(a) a pulley rotatably attached to said input shaft;

(b) a pin located fixedly attached to said input shaft;

(c) a collar positioned around said input shaft, said collar having at least one slot dimensioned to receive at least said pin; and (d) a spring located to bias said collar toward said pin and said pulley.

14. The device according to claim 13, wherein said collar further comprises notches angularly offset to the slot, facing toward said collar.

15. The device according to claim 14 wherein said pulley includes at least one notch facing said collar.

16. The device according to claim 12 further comprising a block having a bore receiving the remaining end of the arm and rotatably secured with the lever.

17. The device according to claim 16 wherein the remaining end of the arm includes a depression and further comprising a member on the block in releasable mating engagement with the depression.

18. A drill press having an axially oscillating chuck comprising:

a frame;

a motor having an output shaft;

a driven shaft laterally spaced from the output shaft;

a quill mounted on the driven shaft for rotation of the driven shaft within the quill and for axial movement of the quill with the driven shaft;

a chuck mounted on one end of the driven shaft;

a first flexible drive coupling between the output shaft and the driven shaft, the flexible coupling including two spaced-apart legs extending generally between the output shaft and the driven shaft;

an oscillatory motion device positioned in the drill press laterally between the output shaft and the driven shaft and between the legs of the first flexible drive coupling, the device being coupled with the quill so as to cyclically reciprocate the quill in an axial direction;

a rotating power take-off driven by one of the output shaft, the driven shaft and the first flexible drive coupling; and a second drive coupling between the oscillatory motion device and the rotating power take-off;

wherein the quill is moveably supported on the frame and the motor is fixedly supported on the frame with the output shaft and the driven shaft parallel and laterally spaced from one another.

19. The drill press according to claim 18 further comprising:

a base;

a head supporting the motor and the quill;

a column supporting the head on the base; and a table at least pivotally supported on the column, the table having an opening in the form of a shaped recess along one side edge of the table, the table being pivotable to position the recess laterally adjoining the chuck.

20. The drill press according to claim 18 wherein the oscillatory motion device comprises a tension limiting link, said link including a detent block coupled with said quill for translational movement of said detent block with axial movement of said quill and an arm releasably engaged directly with said decent block.

21. A drill press having an axially oscillating chuck comprising:

a motor having an output shaft;

a driven shaft;

a quill mounted on the driven shaft;

a chuck mounted on an end of the driven shaft;

a first drive coupling between the output shaft and the driven shaft;

a rotating power take-off driven by one of the output shaft, the driven shaft and the first drive coupling;

a lever having a first end coupled with the quill, the lever being mounted for movement of the first end with axial movement of the quill on the driven shaft; and a second drive coupling between the lever and the rotating power take-off, the second drive coupling including a rotating member and an arm eccentrically coupled at a first end to said rotating member and at a second end to said lever so as to translate rotational movement of said rotating member into generally linear movement at the second end of said arm.

22. A drill press having an axially oscillating chuck comprising:

a motor having an output shaft;

a driven shaft;

a quill mounted on the driven shaft;

a chuck mounted on an end of the driven shaft;

a first drive coupling between the output shaft and the driven shaft;

a rotating power take-off driven by one of the output shaft, the driven shaft and the first drive coupling;

a lever having a first end coupled with the quill, the lever being mounted for movement of the first end with axial movement of the quill on the driven shaft;

a second drive coupling between the lever and the rotating power take-off; and a clutch between said second drive coupling and said rotating power take-off.

23. The drill press according to claim 22, wherein said rotating power take-off comprises a take-off pulley rotatably attached to an input shaft of said second drive coupling.

24. The drill press according to claim 23, wherein said clutch comprises:

(a) a pin located below said take-off pulley and fixedly attached to said input shaft of said second coupling;

(b) a collar located below said take-off pulley and around said input shaft of said second coupling and having at least one slot dimensioned to receive said pin;

(c) a member on at least one of the take-off pulley and the collar extending into interference engagement with the remaining one of the take-off pulley and collar; and (d) a spring located to bias said collar toward said pin and said take-off pulley.

25. The drill press according to claim 24, wherein said collar further comprises a groove angularly offset from the slot, facing toward said take-off pulley.

26. A drill press having an axially oscillating chuck comprising:

a motor having an output shaft;

a driven shaft;

a quill mounted on the driven shaft;

a chuck mounted on an end of the driven shaft;

a first drive coupling between the output shaft and the driven shaft;

a rotating power take-off driven by one of the output shaft, the driven shaft and the first drive coupling, the rotating power take-off including a rotating member:

a lever having a first end coupled with the quill, the lever being mounted for movement of the first end with axial movement of the quill on the driven shaft;

a second drive coupling between the lever and the rotating power take-off;

an arm having a first end coupled with the rotating member for at least some translational movement of the arm with rotation of the rotating member; and a releasable coupling between a second end of the arm and a second end of the lever opposing the first end of the lever.

27. A drill press having an axially oscillating chuck comprising:

a motor having an output shaft;

a driven shaft laterally spaced from the output shaft;

a quill mounted on the driven shaft for rotation of the driven shaft within the quill and for axial movement of the quill with the driven shaft;

a chuck mounted on one end of the driven shaft;

a first flexible drive coupling between the output shaft and the driven shaft, the flexible coupling including two spaced-apart legs extending generally between the output shaft and the driven shaft;

an oscillatory motion device positioned in the drill press laterally between the output shaft and the driven shaft and between the legs of the first flexible drive coupling, the oscillatory motion device being coupled with the quill so as to cyclically reciprocate the quill in an axial direction and including a tension limiting link coupling said oscillatory motion device with said quill, said link including a detent block coupled with said quill for translational movement with translational movement of said quill and an arm releasably engaged directly with said detent block;

a rotating power take-off driven by one of the output shaft, the driven shaft and the first flexible drive coupling;

a second drive coupling between the oscillatory motion device and the rotating power take-off;

a base;

a head supporting the motor and the quill;

a column supporting the head on the base; and a table at least pivotally supported on the column, the table having an opening in the form of a shaped recess along one side edge of the table, the table being pivotable to position the recess laterally adjoining the chuck.

* * * * *